(12) United States Patent
Wright et al.

(10) Patent No.: US 7,072,881 B1
(45) Date of Patent: Jul. 4, 2006

(54) METHOD AND SYSTEM FOR MANAGING TELECOMMUNICATIONS REPORTS

(75) Inventors: Robert H. Wright, Ramsey, IN (US); Gary Thomas Metcalf, Louisville, KY (US); Willard A. Weitlauf, Jr., Louisville, KY (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 434 days.

(21) Appl. No.: 09/995,042

(22) Filed: Nov. 27, 2001

(51) Int. Cl.
*G06F 17/30* (2006.01)

(52) U.S. Cl. .......................................... 707/3; 707/10

(58) Field of Classification Search ............... 707/1–3, 707/9, 10, 104.1, 4, 103 R; 709/223, 224, 709/225, 227–230, 219, 217; 379/9, 265.2, 379/309, 112.01, 201.05; 705/10
See application file for complete search history.

(56) References Cited

U.S. PATENT DOCUMENTS

| | | | | |
|---|---|---|---|---|
| 5,692,181 A * | 11/1997 | Anand et al. | ............... | 707/102 |
| 5,754,830 A * | 5/1998 | Butts et al. | ................. | 719/311 |
| 5,799,073 A * | 8/1998 | Fleischer et al. | ...... | 379/112.01 |
| 5,875,242 A * | 2/1999 | Glaser et al. | .......... | 379/201.05 |
| 5,974,441 A * | 10/1999 | Rogers et al. | .............. | 709/200 |
| 5,991,733 A * | 11/1999 | Aleia et al. | .................... | 705/8 |
| 6,058,170 A * | 5/2000 | Jagadish et al. | ............ | 379/119 |
| 6,115,458 A * | 9/2000 | Taskett | ..................... | 379/114.2 |
| 6,128,624 A * | 10/2000 | Papierniak et al. | ...... | 707/104.1 |
| 6,141,777 A * | 10/2000 | Cutrell et al. | ................. | 714/47 |
| 6,161,102 A * | 12/2000 | Yanagihara et al. | ............ | 707/3 |
| 6,205,456 B1 * | 3/2001 | Nakao | ......................... | 715/531 |
| 6,212,511 B1 * | 4/2001 | Fisher et al. | .................... | 707/1 |
| 6,216,164 B1 * | 4/2001 | Zaremba, Jr. | ................ | 709/227 |
| 6,270,351 B1 * | 8/2001 | Roper | ......................... | 434/118 |
| 6,327,571 B1 * | 12/2001 | Khayat et al. | ................. | 705/10 |
| 6,370,573 B1 * | 4/2002 | Bowman-Amuah | ......... | 709/223 |
| 6,377,993 B1 * | 4/2002 | Brandt et al. | ................ | 709/227 |
| 6,449,588 B1 * | 9/2002 | Bowman-Amuah | .......... | 703/21 |
| 6,631,402 B1 * | 10/2003 | Devine et al. | .............. | 709/217 |
| 6,714,979 B1 * | 3/2004 | Brandt et al. | ................ | 709/225 |
| 6,862,591 B1 * | 3/2005 | Majewski et al. | ............. | 707/3 |
| 2003/0055976 A1 * | 3/2003 | Hartmann et al. | .......... | 709/227 |

* cited by examiner

*Primary Examiner*—Greta Robinson
*Assistant Examiner*—Jacques Veillard
(74) *Attorney, Agent, or Firm*—Merchant & Gould

(57) ABSTRACT

A method for managing telecommunications reports comprises receiving customer data in a mainframe database system based on a plurality of customer submissions. A report is generated in the mainframe database system based on the customer data in the mainframe database system. Summaries of the generated reports are printed to a printer emulator. Selected data from the printed report summaries are imported into a spreadsheet. A terminal emulator connects to the mainframe database system and prints selected reports to the printer emulator. The printed reports are stored on a storage device.

14 Claims, 7 Drawing Sheets

|   | A | B | C | D | E | F | G | H | I | J |
|---|---|---|---|---|---|---|---|---|---|---|
| 1 | DATE | ACNA | Print? | CIC | B/D | DD | ASR | CKT ID | Action | SUP |
| 2 | 10/22/01 | ABC | Y | 5646 | D | 11/01/01 | 0005298652 | 1 /JA5-FJIDNFP | N | 2 |
| 3 | 10/22/01 | ABC | N | 5646 | D | 11/01/01 | 0005298652 | 25 /JA5-FJIDNFP | N | 2 |
| 4 | 10/22/01 | ABC | N | 5646 | D | 11/01/01 | 0005298652 | 49 /JA5-FJIDNFP | N | 2 |
| 5 | 10/22/01 | ABC | N | 5646 | D | 11/01/01 | 0005298652 | 76 /JA5-FJIDNFP | N | 2 |
| 6 | 10/22/01 | ABC | N | 5646 | D | 11/01/01 | 0005298652 | 108 /JA5-FJIDNFP | N | 2 |
| 7 | 10/22/01 | ABC | N | 5646 | D | 11/01/01 | 0005298652 | 129 /JA5-FJIDNFP | N | 2 |
| 8 | 10/22/01 | ABC | N | 5646 | D | 11/01/01 | 0005298652 | 136 /JA5-FJIDNFP | N | 2 |
| 9 | 10/22/01 | XYZ | Y | 2858 | D | 12/01/01 | 0005826354 | 6 /BR2-ZCMVNB | N | 3 |
| 10 | 10/22/01 | XYZ | N | 2858 | D | 12/01/01 | 0005826354 | 15 /BR2-ZCMVNB | N | 3 |
| 11 | 10/22/01 | XYZ | N | 2858 | D | 12/01/01 | 0005826354 | 36 /BR2-ZCMVNB | N | 3 |
| 12 | 10/22/01 | XYZ | N | 2858 | D | 12/01/01 | 0005826354 | 64 /BR2-ZCMVNB | N | 3 |
| 13 | 10/22/01 | XYZ | N | 2858 | D | 12/01/01 | 0005826354 | 83 /BR2-ZCMVNB | N | 3 |
| 14 | 10/22/01 | XYZ | N | 2858 | D | 12/01/01 | 0005826354 | 117 /BR2-ZCMVNB | N | 3 |
| 15 | 10/22/01 | XYZ | N | 2858 | D | 12/01/01 | 0005826354 | 129 /BR2-ZCMVNB | N | 3 |
| 16 | 10/22/01 | ABC | Y | 5646 | D | 10/23/01 | 0004526987 | 4 /PL3-QUWPTB | N | 3 |
| 17 | 10/21/01 | ABC | N | 5646 | D | 10/23/01 | 0004526987 | 65 /PL3-QUWPTB | N | 3 |
| 18 | 10/21/01 | XYZ | Y | 2858 | D | 10/25/01 | 0004289684 | 72 LJ9-CBDIOM | N | 4 |
| 19 | 10/21/01 | XYZ | N | 2858 | D | 10/25/01 | 0004289684 | 153 LJ9-CBDIOM | N | 4 |

FIG. 3

METHOD AND SYSTEM FOR MANAGING TELECOMMUNICATIONS REPORTS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention relates to methods and systems for managing telecommunications reports, and in particular, methods and systems for managing reports based on customer information.

BACKGROUND

Telecommunications companies must collect and store a large number of documents. Employees of a telecommunications company may need to access these documents periodically. For example, a telecommunications company regularly receives requests from its customers (both interexchange carriers and end users) to access its switches and trunks. The telecommunications company may be required by the public service commission to maintain a copy of these access service requests ("ASRs"). Other documents, such as detailed trunk records ("DTRs"), are internal documents used by telecommunications companies to provision trunks. DTRs comprise data relating to trunk options and to trunk provisioning.

These documents (e.g., ASRs and DTRs) are regularly entered and temporarily stored on mainframe database systems. For example, customers typically request service over the telephone and an operator enters the relevant information into the mainframe database system. The information entered by the operator is assembled into a report on the mainframe database system. Cover sheets for the reports, which contain summary information from the reports, are regularly printed (e.g., every morning). A person employed by the telecommunications company retrieves the report cover sheets from the printer, logs in to the mainframe database system each morning, and prints certain full reports to a paper printer based on the cover sheets. The person may, for instance, only print reports for service requests entered that same day. The person manually distributes the documents to the people that need them to do the work (e.g., provide the requested network access to the customers). The person also collects the printed documents, separates the printed documents, and files the documents in a file cabinet.

The company may be required by law or by good business-practice to maintain copies of the documents for a specified period of time. Further, technicians may need to access these documents at a later date. For example, ASRs provide important records of how customers ordered services. A technician wanting to access a particular ASR must locate the ASR in a file cabinet storage area and manually retrieve it.

It would be desirable to have a system and method that automated these tasks and provided for the electronic collection and storage of telecommunications documents. It would also be desirable for technicians to be able to access these documents using personal computers rather than accessing the mainframe database system or searching hard copies in a file cabinet.

SUMMARY OF THE INVENTION

The present invention relates to methods and systems for managing telecommunications reports. As used herein, "telecommunications reports" include, but are not limited to, access service requests, detailed trunk records, and other reports based on customer information (e.g., customer requests or customer submissions).

In one embodiment, a method for managing customer service request reports comprises receiving customer data in a mainframe database system based on a plurality of customer requests, generating a report for each of the plurality of customer requests based on the customer data in the mainframe database system, printing summaries of the reports to a printer emulator, importing selected data from the report summaries into a spreadsheet; and delivering the spreadsheet to at least one terminal. Customer data may comprise, for example, customer names, locations, and service request dates. Selected data may comprise, for example, report numbers and service request dates.

In another embodiment, a method of the present invention may further comprise selecting at least one report based on the selected data in the spreadsheet. The spreadsheet will place an indicator (e.g., "Y") in a column of the spreadsheet to indicate that the report has been selected for printing by default. An operator may deselect items if desired. If the date matches the current date and the indicator is "Y", then the reports are printed. The selected reports may be printed at a specified time (e.g., when requested by an operator, when requested by a computer, or at regular intervals).

After the spreadsheet is delivered to a terminal, a terminal operator may view the spreadsheet and select reports based on the data in the spreadsheet. The reports may be selected by the operator for subsequent printing. The spreadsheet may include a column indicating whether the report was automatically selected by the spreadsheet (e.g., reports are automatically selected if the service request date is the current date). When the spreadsheet is delivered to a terminal, an operator may change the automatic designation of the report (e.g., select an unselected report or deselect a selected report).

In another embodiment, a method of the present invention comprises receiving customer data in a mainframe database system based on a plurality of customer requests, generating a report for each of the plurality of customer requests based on the customer data in the mainframe database system, printing summaries of the reports to a printer emulator, importing selected data from the report summaries into spreadsheet, selecting reports based on the selected data, printing the selected reports to the printer emulator, storing the printed reports on a storage device. Customer data may comprise, for example, customer names, locations, and service request dates.

The selected data may comprise, for example, report numbers and service request dates. In embodiments where the selected data includes service request dates, the reports may be selected based on the service request dates (e.g., a report is selected if the service request date is the current date).

In a further embodiment, the printed reports are saved as word processing documents, such as Microsoft Word documents. Each generated report may have a unique report number associated with it. In an embodiment where the generated reports each have unique report numbers, the file name for each saved report comprises the report number. In a further embodiment, the saved reports are saved on a file server and may be accessed from remote locations.

The customer data may be deleted from the mainframe database system in a further embodiment. The customer data may be deleted after reports based on the customer data are generated. In other embodiments, each generated report is also deleted from the mainframe database system. A generated report may be deleted after the generated report is selected and printed to the printer emulator.

The present invention also relates to systems for managing customer service request reports. In one embodiment, a system of the present invention comprises a mainframe database system, a computer and in communication with the mainframe database system, and at least one terminal in communication with the computer. The mainframe database system receives customer data, including service request dates, based on a plurality of customer requests. The mainframe database system generates a report based on each of the plurality of customer requests.

The computer may further comprise a printer emulator and a spreadsheet. Summaries of the reports generated by the mainframe database system are printed to the printer emulator. Selected data from the report summaries are imported into the spreadsheet, and the spreadsheet is delivered to the at least one terminal. Operators at the terminals may view and edit the spreadsheet.

In another embodiment, a system of the present invention comprises a mainframe database system, a computer in communication with the mainframe database system comprising a printer emulator and a terminal emulator, and a file server in communication with the computer.

The mainframe database system receives customer data, including service request dates, based on a plurality of customer requests. The mainframe database system generates a report based on each of the plurality of customer requests, and summaries of the reports are printed to the printer emulator. The terminal emulator connects to the mainframe database system and selects reports based on the summaries of the reports. The selected reports are printed to the printer emulator, and the printed reports are stored on the file server. In a further embodiment, the printed reports may be stored on the file server as word processing documents.

In an embodiment directed to managing customer usage reports, a method of the present invention comprises receiving customer data in a mainframe database system based on a plurality of customer usage submissions. A report is generated for each of the plurality of customer usage submissions based on the customer data in the mainframe database system. A unique report number is assigned for each of the generated reports. At least one of the generated reports is selected for printing. A file comprising report numbers for the selected reports is generated. The file is printed to a printer emulator, and selected data from the printed file are imported into a spreadsheet. A terminal emulator connects to the mainframe database system. The selected reports are printed to the printer emulator, and the printed reports are saved.

A feature and advantage of the present invention is to provide a method and system for managing telecommunications reports that result in significant time savings to a company.

Another feature and advantage of the present invention is to provide a method and system for storing telecommunications reports that are easily searchable and accessible by technicians.

A further feature and advantage of the present invention is to provide a method and system for managing telecommunications reports that enable technicians to search for reports using their computers.

A still further feature and advantage of the present invention is to provide an automatic method and system for managing telecommunications reports.

Another feature and advantage of the present invention is to reduce the amount of time and personnel required to manage telecommunications reports.

A further feature and advantage of the present invention is to reduce the amount of paper and printer ribbons used in managing telecommunications reports.

Additional uses, objects, advantages, and novel features of the invention are set forth in the detailed description that follows and will become more apparent to those skilled in the art upon examination of the following or by practice of the invention.

BRIEF DESCRIPTION OF THE FIGURES

FIG. 3 is an example of a spreadsheet that may be created according to one embodiment of the present invention.

DETAILED DESCRIPTION

The present invention relates to methods and systems for managing telecommunications reports. As used herein, "telecommunications reports" include, but are not limited to, access service requests, detailed trunk records, and other reports based on customer information (e.g., customer requests or customer submissions).

The present invention is particularly useful in systems where customer data relating to a customer service request is entered into a mainframe database system by a customer service representative or other operator, and technicians need to regularly view, print, and store reports generated based on the customer data.

Figure 1:
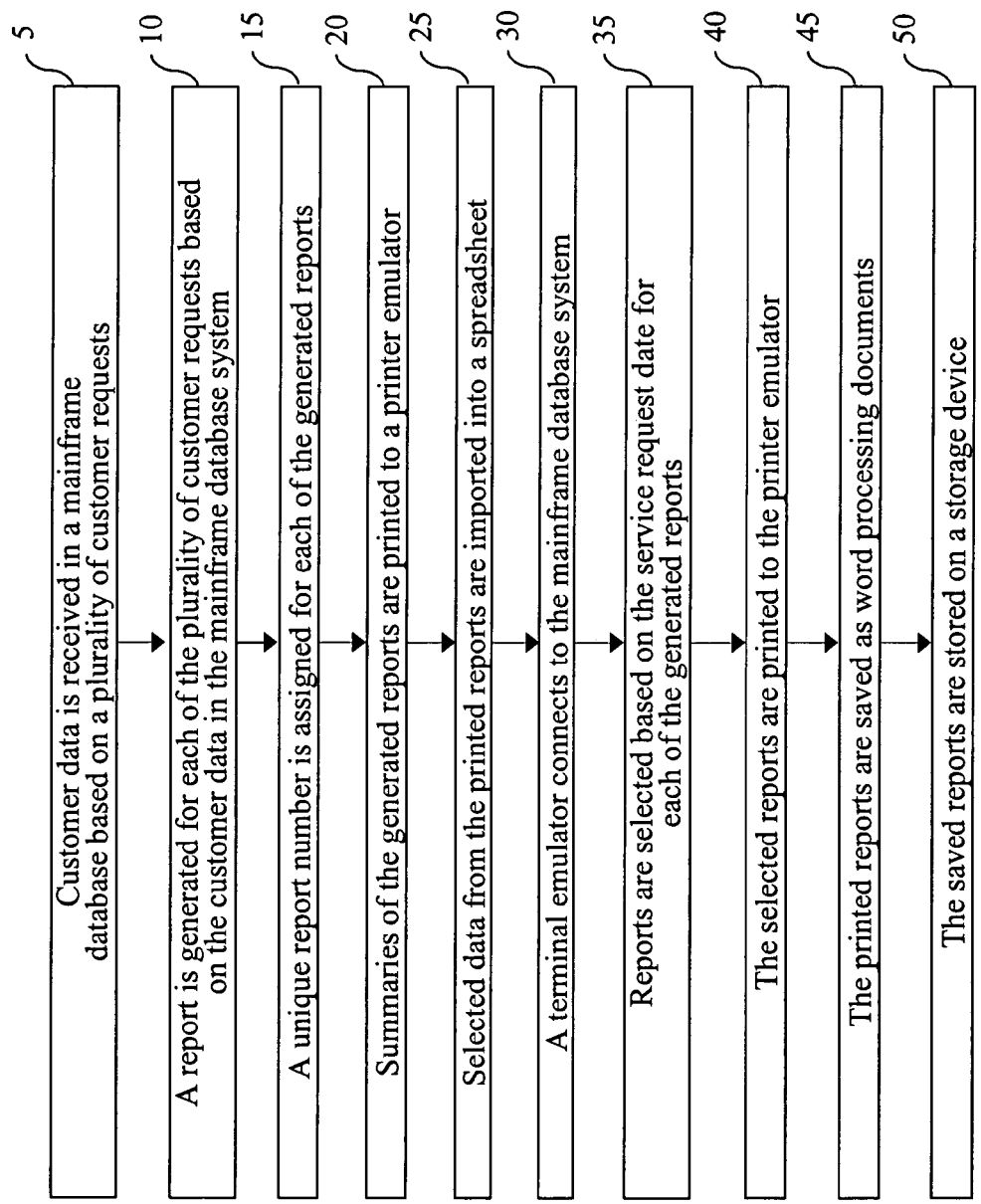
FIG. 1 is a flowchart illustrating an exemplary method of managing telecommunications reports in an embodiment of the present invention.

Referring now to the figures, FIG. 1 is a flowchart illustrating an exemplary method of managing telecommunications reports in an embodiment of the present invention. Customer data is received 5 in a mainframe database system. For example, a customer may call a customer service representative and request service, may email the telecommunications company and request service, or may send a facsimile to the telecommunications company to request service. The operator enters certain customer data into the mainframe database system. Examples of customer data include customer name, location, service request date, number of connections needed, service request date, customer service termination date, customer identification code, etc.

The mainframe database system generates 10 a report for each customer request based on the customer data in the mainframe database system. The mainframe database system may include an application that generates a report for each customer request after the customer data is entered. The report may include the customer data and other customer information (e.g., information about prior service requests by the customer) and may organize the customer data in a manner that is useful to technicians. A unique report number 15 is assigned to each of the generated reports.

While a number of reports may be generated regularly, technicians may only need to view certain reports on a particular day. For example, technicians may only want to view a report on the day that the customer has requested the service. However, the technicians may need to be aware of the customer service requests when the reports are generated.

Figure 2:
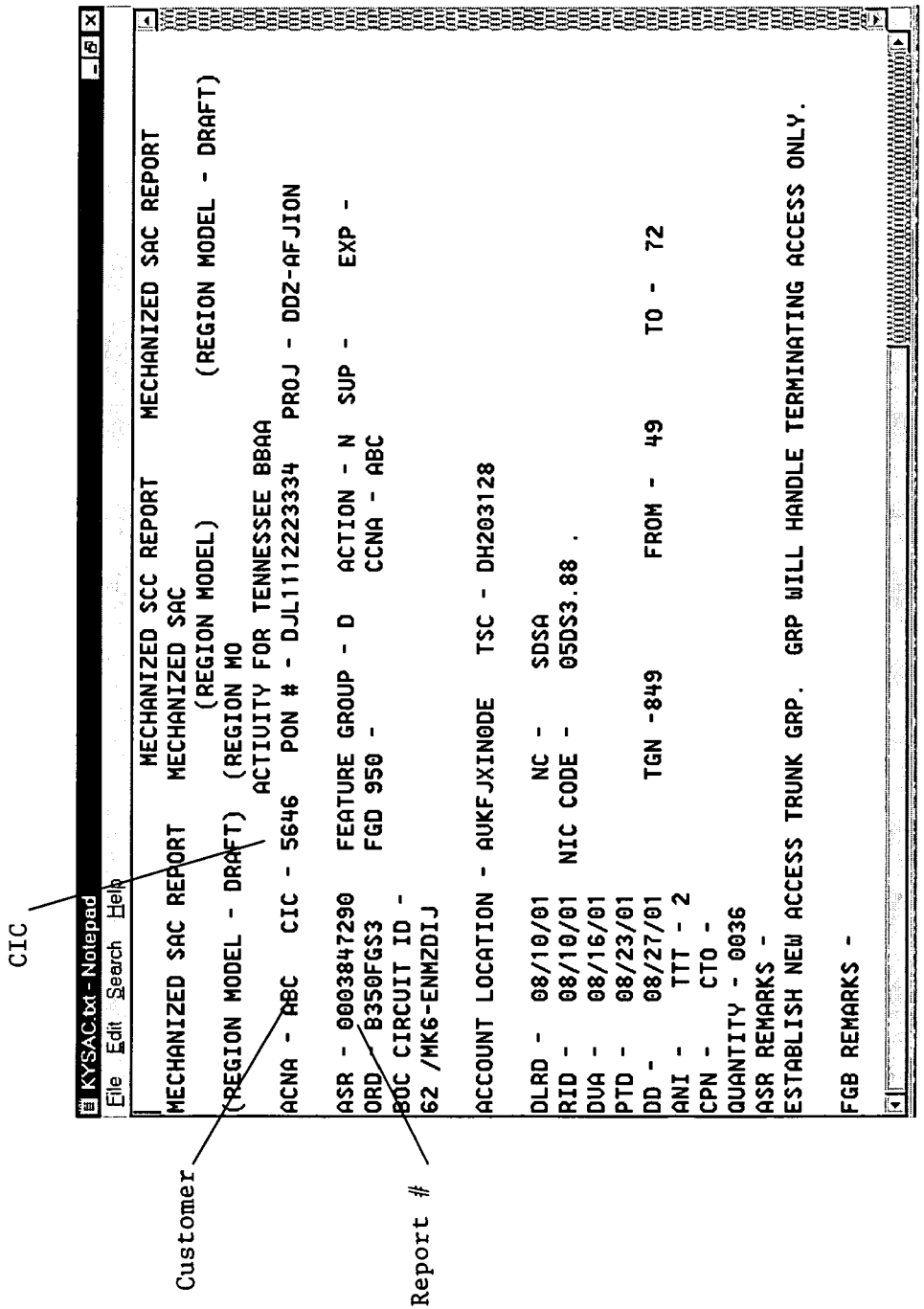
FIG. 2 is an example of a report summary in one embodiment of the present invention.

Summaries of the generated reports 20 are printed periodically to a printer emulator. The report summaries contain enough information to determine whether a complete report needs to be viewed in order to provision service for the customer. The report summaries are printed on a regular basis, such as early in the morning (before a normal work day begins). In one embodiment, a report summary is the cover page for each report. FIG. 2 is an example of a report summary in one embodiment of the present invention, including a customer name, a report number, and a Carrier Information Code (CIC).

The printer emulator may comprise a computer, such as a PC, that is connected to the mainframe database system as a network printer. The computer listens to a particular Winsock port for incoming data and emulates a printer. The mainframe database system does not know that the data are not going to a printer. The printer emulator receives the data into an ASCII text file.

An applet, such as a Visual Basic program, then opens the text file, parses the text file, and imports 25 selected data from the text file into a spreadsheet. Selected data may include, for example, customer request date, Access Customer Name (ACNA), Carrier Information Code (CIC), Feature Groups "B" or "D" (B/D), service request date, report number, Circuit ID (CKT ID), Add/Delete/Change Action, and Supplemental Change (SUP) (e.g., "Due Date Change"). The report summaries each have the same format, such that the applet locates the selected data in the text file and populates the cells of the spreadsheet with the selected data. The selected data for each report summary preferably occupies a single row in the spreadsheet.

The spreadsheet may be, for example, a Microsoft Excel spreadsheet. The spreadsheet is saved on the computer that acts as a terminal emulator. The computer may be connected to a local area network and may be accessed from other terminals or work stations. The spreadsheet may also be automatically delivered to other computers on the network or over the Internet. FIG. 3 is an example of a spreadsheet that may be created according to one embodiment of the present invention.

A report collector program may then open the spreadsheet and request certain reports based on the information in the spreadsheet. The report collector program, may be, for example, a Visual Basic 6 program and is preferably located on the same computer where the spreadsheet is stored. The spreadsheet may include a "print report" column, which indicates whether the operator wants the Visual Basic program to print the service request on that row. When the report collector program opens the spreadsheet, the "print report" column may be updated. If the "print report" column includes a positive indicator (e.g., a "Y" or "Yes") and the "Date" column is equal to today's date, then the report collector program selects the report for "printing." A number of reports may be selected 35 for printing. There are also provisions for printing previous dates.

The report collector program then initiates a terminal emulator application. An example of a terminal emulator application useful in the present invention is Attachmate Extra. The terminal emulator connects 30 to the mainframe database system. The terminal emulator allows the computer to act as a terminal that the mainframe database system recognizes.

After connecting to the mainframe database system, the terminal emulator submits a print request for the selected reports. The selected reports are then printed 45 to the printer emulator. The printer emulator is preferably the same printer emulator that received the report summaries. As noted above, the computer having the printer emulator is connected to the mainframe database system as a network printer. The computer having the printer emulator receives the printed report into an ASCII text file.

As the printed reports are received, another Visual Basic program parses the information and saves 45 the printed reports on a file server. The reports are preferably saved as word processing documents that are compatible with conventional word processing applications, such as Microsoft Word. The file name for the saved reports may be the report number. The saved reports are preferably stored 50 on a storage device, such as a file server. The file server is preferably connected to a local area network, such that a person may access the stored reports from a terminal or work station. In other embodiments, the file server is connected to the Internet, such that the reports may be accessed from a remote location. In a further embodiment, the saved or stored reports may be updated or modified by a person or computer accessing the file server.

Figure 4:
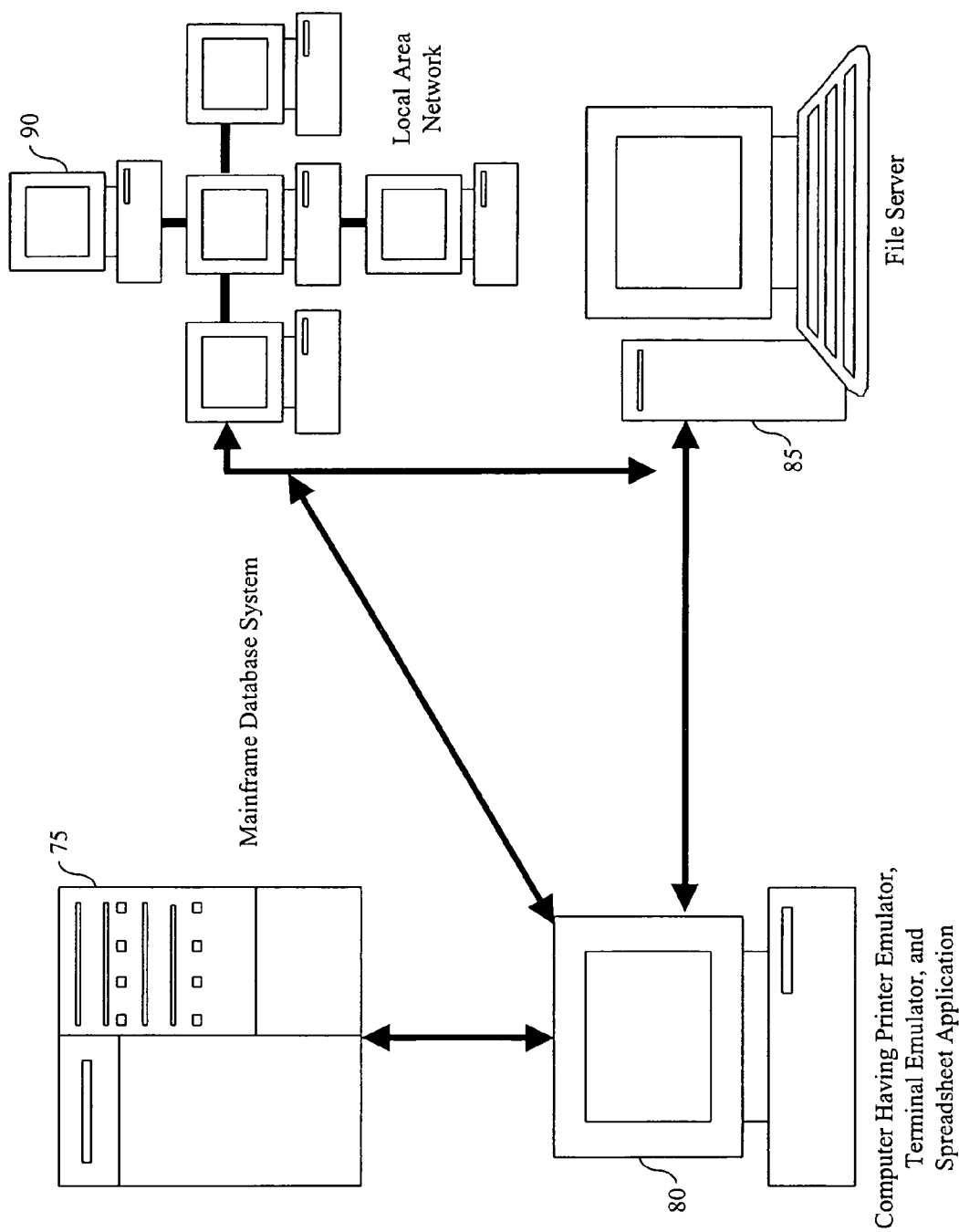
FIG. 4 is a schematic illustrating an embodiment of a system of the present invention for managing telecommunications reports.

FIG. 4 is a schematic illustrating an embodiment of a system of the present invention for managing telecommunications reports. The system illustrated in FIG. 4 includes a mainframe database system 75, a computer 80 comprising a printer emulator and a terminal emulator, and a file server 85.

The mainframe database system receives customer data (e.g., service request dates, customer names, customer service requests, etc.) based on customer requests. The computer 80 comprising a printer emulator and a terminal emulator is in communication with the mainframe database system 75. The mainframe database system 75 generates a report based on each of the customer requests. Summaries of the reports (e.g., report cover sheets) are printed to the printer emulator on the computer 80.

The computer 80 may further include a spreadsheet application, such as Microsoft Excel. When the report summaries are printed to the printer emulator on the computer 80, selected data from the printed report summaries are imported into the spreadsheet on the computer 80. The selected data includes, for example, service request dates, customer request dates, customer names, and report numbers. The spreadsheet is then saved on the computer 80. The spreadsheet may also be stored on the file server 85 and/or sent to other computers. The other computers may be connected to a local area network 90 or may be remote computers connected to the Internet.

After the selected data are imported into the spreadsheet on the computer 80, a report collector program, such as a Visual Basic for Applications program, opens the spreadsheet and requests certain reports based on the information in the spreadsheet. The reports may be selected, for example, based on the service request dates.

The report collector program then initiates a terminal emulator application on the computer 80. The terminal emulator on the computer 80 connects to the mainframe database system 75. The terminal emulator allows the computer 80 to act as a terminal that the mainframe database system 75 recognizes. After connecting to the mainframe database system 75, the terminal emulator submits a print request for the selected reports. The selected reports are then printed to the printer emulator on the computer 80.

As the printed reports are received, another Visual Basic program on the computer 80 parses the information and saves the printed reports on a file server 85. The reports are preferably saved as word processing documents that are compatible with conventional word processing applications, such as Microsoft Word. As shown in FIG. 4, the file server is connected to a local area network 90, such that a person may access the stored reports from a terminal or work station. In other embodiments, the file server is connected to the Internet, such that the reports may be accessed from a remote location. In a further embodiment, the saved or stored reports may be updated or modified by a person or computer accessing the file server.

Mainframe database systems suitable for use in the present invention may include, for example, Exact/WFA/DI IBM Main Frame Databases.

As noted above, a computer is in communication with the mainframe database system. For example, the computer may be connected to the mainframe database system as a network printer. Examples of computers suitable for use in the present invention may include, for example, IBM computers with Pentium III processors, having one hundred twenty-eight megabytes (128 MB) of RAM, a ten gigabyte (10 GB) hard drive and running Windows NT or Windows 2000.

Examples of printer emulator applications suitable for use in the present invention include commercially available Line Printer Remote ("LPR") programs. An example of a terminal emulator application useful in the present invention is Attachmate Extra.

Examples of file servers useful in the present invention include servers manufactured by IBM, Compaq, Hewlett-Packard, or other server manufactures, and running server applications such as Windows NT Server, Novell Netware, and Unix.

Figure 5:
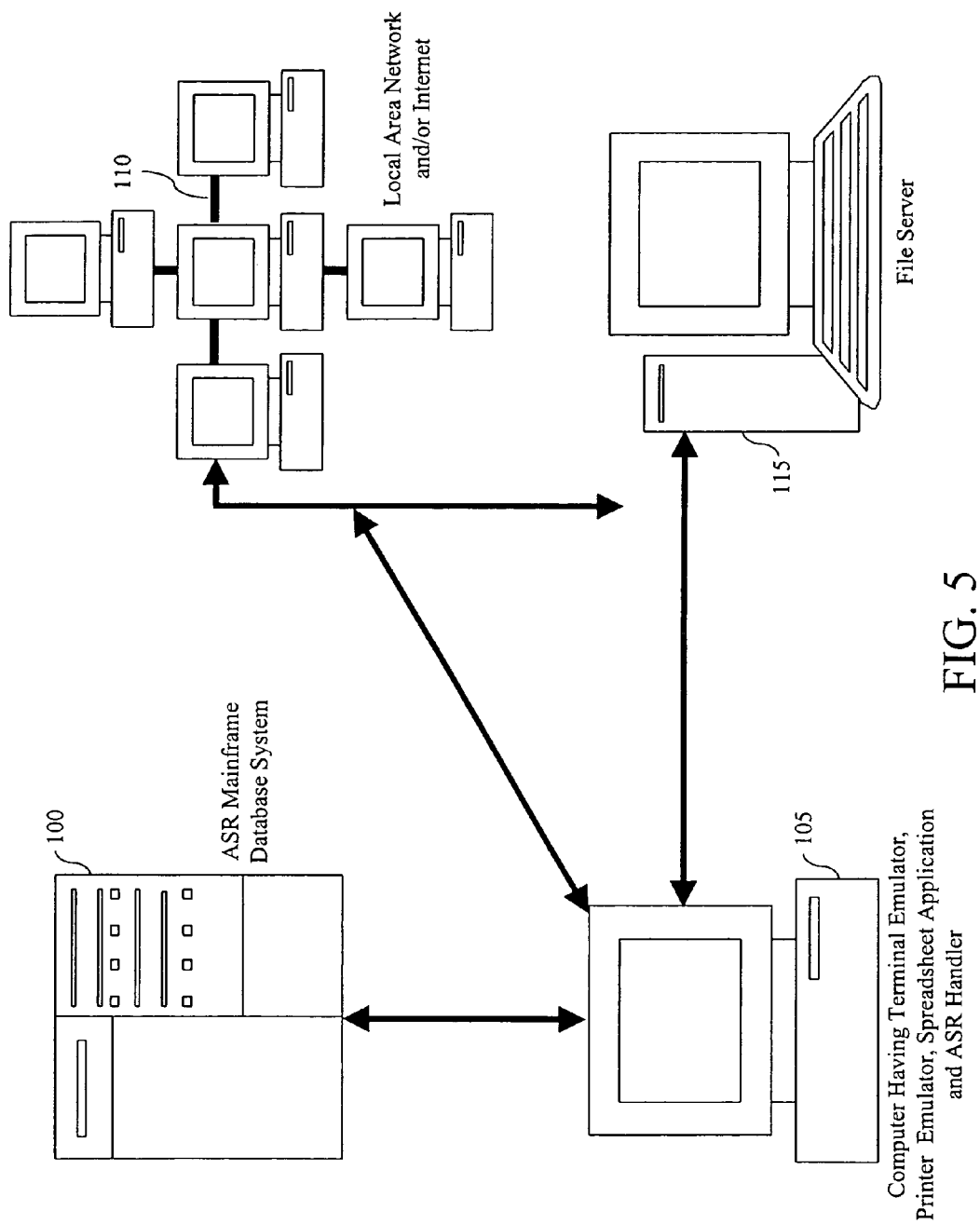
FIG. 5 is a schematic illustrating another embodiment of a system of the present invention for managing access service requests.
Figure 6:
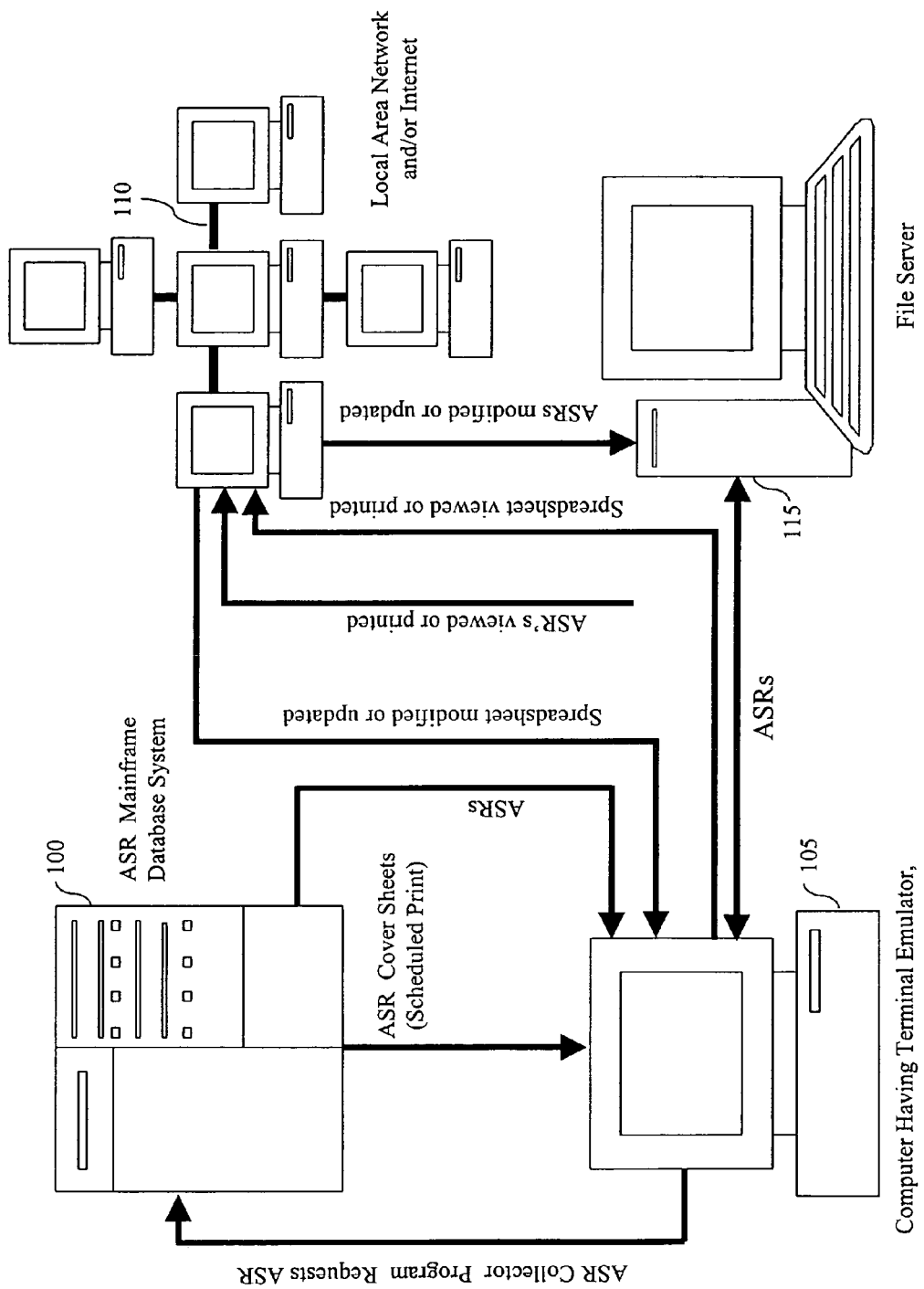
FIG. 6 is a schematic illustrating an embodiment of a system of the present invention and the transfer of data and files between components.

FIG. 5 is a schematic illustrating another embodiment of a system of the present invention for managing access service requests (ASRs). FIG. 6 is a schematic illustrating the transfer of data and files between components in an embodiment of a system for managing ASRs. Access service requests are customer service request reports that are generated when customers (both inter-exchange carriers and end users) request access to the telecommunications company's switches and trunks. An access service request is generated for each separate request from each customer. A customer contacts the telecommunications company (e.g., by telephone, email, facsimile, etc.) and requests access.

When a customer contacts the telecommunications company, a customer service representative of the telecommunications company enters the relevant information into an ASR mainframe database system 100. The ASR mainframe database system 100 generates an ASR for the request. A unique ASR number is assigned to each ASR.

A computer 105 is connected to the ASR mainframe database system 100 as a network printer. Summaries of the ASRs are printed periodically to the computer 105 using a printer emulator application. In one embodiment, the ASR summaries are cover sheets for each of the ASRs. The ASR summaries contain enough information to determine whether a complete report needs to be viewed in order to provision service for the customer. The ASR summaries may be printed on a daily basis, such as early in the morning (before a normal work day begins). The printer emulator application on the computer 105 receives the data into an ASCII text file.

The computer 105 also includes a spreadsheet application. When text files are received from the ASR mainframe database system 100, an applet, such as a Visual Basic program, then opens the text file, parses the text file, and imports selected data from the text file into a spreadsheet. Selected data from ASRs may include, for example, customer request date, Access Customer Name (ACNA), Circuit Information Code (CIC), Feature Group selection (B/D), service request date, report number, Circuit ID (CKT ID), Change/Add/Delete Action, and Supplemental Change (SUP) (e.g., "Due Date Change Only"). The ASR summaries each have the same format, such that the applet locates the selected data in the text file and populates the cells of the spreadsheet with the selected data. The selected data for each ASR summary preferably occupy a single row in the spreadsheet.

The spreadsheet is saved on the computer 105. The computer 105 may be connected to a local area network 110 and/or the Internet, and may be accessed from other terminals or work stations. The spreadsheet may also be automatically delivered to other computers on the network 110 or over the Internet.

Another program on the computer 105, an ASR collector program, may then open the spreadsheet and request certain ASRs based on the information in the spreadsheet. The ASR collector program, may be, for example, a Visual Basic 6 program. The spreadsheet may include a "Print?" column, which indicates whether the service request should be printed. If the "Print?" column includes a positive indicator (e.g., a "Y" or "Yes") and the date column matches today's date, then the ASR collector program selects the ASR for "printing." A number of ASRs may be selected for printing. In some embodiments, a technician is able to access the spreadsheet and manually select or deselect an ASR for printing.

The computer 105 also includes a terminal emulator application, such as Attachmate Extra. After opening the spreadsheet and selecting ASRs for printing, the ASR collector program then initiates the terminal emulator application. The terminal emulator connects the computer 105 to the ASR mainframe database system 100.

After connecting to the ASR mainframe database system 100, the terminal emulator submits a print request for each of the selected ASRs. The selected ASRs are then printed to the printer emulator on the computer 105 as ASCII text files.

As the printed ASRs are received, another Visual Basic program, the ASR Handler, parses the information and saves the printed ASRs. The ASRs are preferably saved as word processing documents that are compatible with conventional word processing applications, such as Microsoft Word. The file names for the saved ASRs includes the ASR number to facilitate subsequent searches by technicians.

The saved ASRs are stored on a storage device, such as a file server 115. The file server 115 is connected to a local area network 110 and/or the Internet, such that a person may access the stored ASRs from a terminal or work station. ASRs can be accessed, for example, using the "Find" function ("Find"→"Files or Folders" from "Start") in Microsoft Windows operating systems. If ASRs are stored in a shared directory, they can be accessed from any technician's computer either via the local area network 110 or from a remote location via the Internet. The saved or stored ASRs may be viewed, printed, updated, and/or modified by a person or computer accessing the file server 115.

At some point, usually after being saved on the file server 115, the ASRs are removed from the ASR mainframe database system 100.

Figure 7:
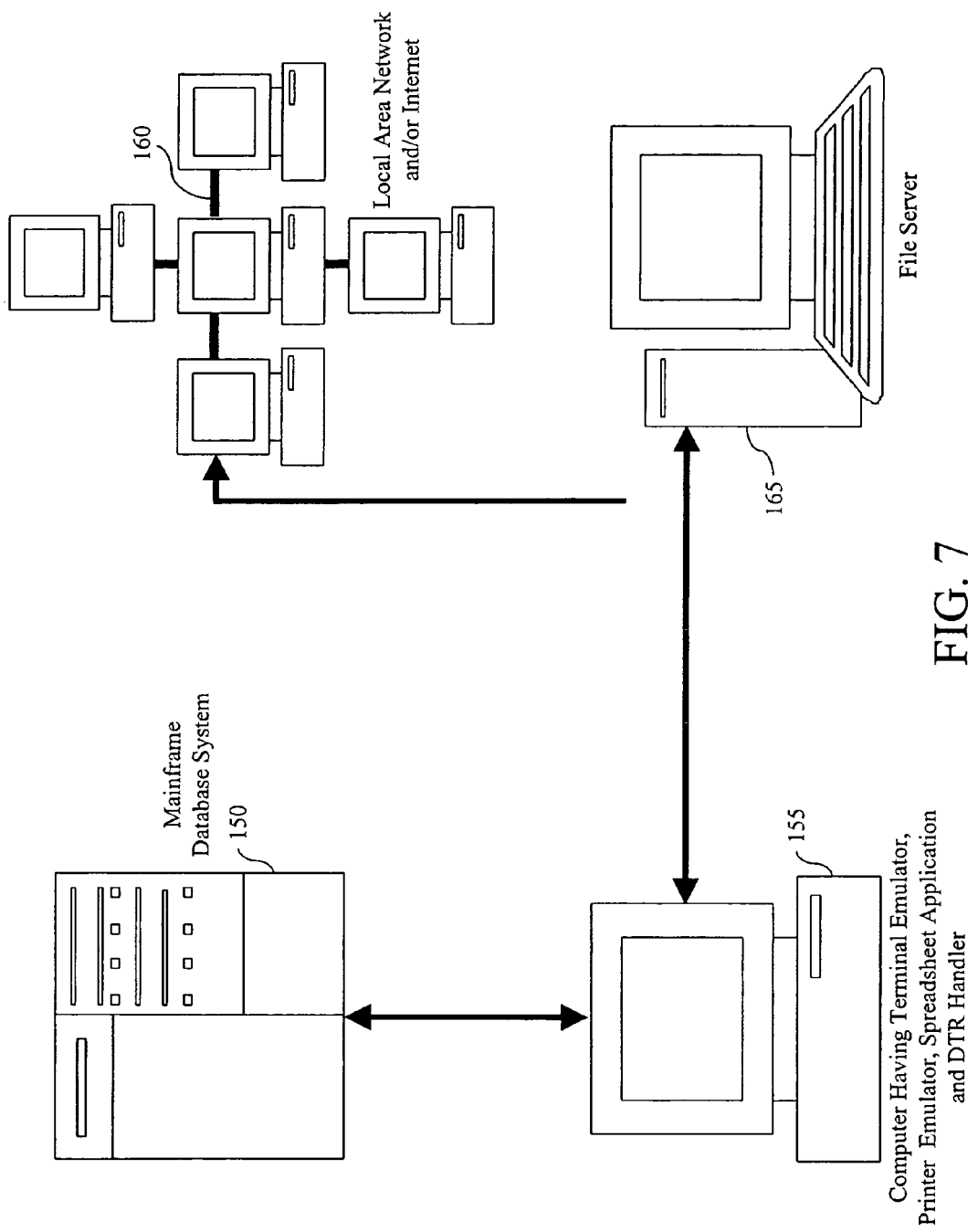
FIG. 7 is a schematic illustrating another embodiment of a system of the present invention for managing detailed trunk records.

FIG. 7 is a schematic illustrating an embodiment of a system of the present invention for managing detailed trunk records. Detailed Trunk Records (DTRs) are internal provisioning documents. The DTRs comprise data relating to options associated with provisioning a trunk. Examples include central office equipment and software values. A DTR may be generated by a Circuit Provisioning Group (CPG).

When a customer provides information to the telecommunications company relating to its usage of a trunk, a customer service representative of the telecommunications company enters the relevant information into a mainframe database system 150. The mainframe database system 150 generates a DTR based on the information. A unique number, such as a Circuit Layout Order (CLO), is assigned to each DTR.

A computer 155 is connected to the mainframe database system 150 as a network printer. An application on the mainframe database system 150 generates an "Open Query System Report" (OQS report) that identifies all of the DTRs that need to be printed at a particular time (e.g., for a particular day). The OQS Report may list, for example, all of the DTRs that enter the system on a particular day. In one embodiment, each DTR on the list needs to be printed. The OQS Report is printed periodically to the computer 155 using a printer emulator application. The OQS report may be printed on a daily basis, such as early in the morning (before a normal work day begins). The printer emulator application on the computer 155 receives the data into an ASCII text file.

The computer 155 also includes a spreadsheet application. When a text file is received from the mainframe database system 150, an applet, such as a Visual Basic program, then opens the text file, parses the text file, and imports selected data from the text file into a spreadsheet. Selected data from OQS Report may include, for example, the CLO number. The applet locates the selected data in the text file and populates the cells of the spreadsheet with the selected data. The selected data preferably occupy a single row in the spreadsheet.

The spreadsheet is saved on the computer 155. The computer 155 may be connected to a local area network 160 and/or the Internet, and may be accessed from other terminals or work stations. The spreadsheet may also be automatically delivered to other computers on the network 160 or over the Internet.

Another program on the computer 160, a DTR requestor program, then opens the spreadsheet and requests certain DTRs based on the information in the spreadsheet. The DTR requestor program, may be, for example, a Visual Basic 6 program. In one embodiment, the spreadsheet contains only the CLO numbers for DTRs that should be printed. In some embodiments, a technician is able to access the spreadsheet and manually add or remove a particular CLO number associated with a DTR to control the printing of that DTR.

The computer 155 also includes a terminal emulator application, such as Attachmate Extra. After opening the spreadsheet, the DTR requestor program then initiates the terminal emulator application. The terminal emulator connects the computer 155 to the mainframe database system 150.

After connecting to the mainframe database system 150, the terminal emulator submits a print request for each DTR associated with a CLO in the spreadsheet. The selected DTRs are then printed to the printer emulator on the computer 155 as ASCII text files.

As the printed DTRs are received, another Visual Basic program, the DTR Handler, parses the information and saves the printed DTRs. The DTRs are preferably saved as word processing documents that are compatible with conventional word processing applications, such as Microsoft Word. The file names for the saved DTRs includes the CLO number to facilitate subsequent searches by technicians.

The saved DTRs are stored on a storage device, such as a file server 165. The file server 165 is connected to a local area network 160 and/or the Internet, such that a person may access the stored DTRs from a terminal or work station. DTRs can be accessed, for example, using the "Find" function ("Find"→"Files or Folders" from "Start") in Microsoft Windows operating systems. If DTRs are stored in a shared directory, they can be accessed from any technician's computer either via the local area network 160 or from a remote location via the Internet. The saved or stored DTRs may be viewed, printed, updated, and/or modified by a person or computer accessing the file server 165.

At some point, usually after being saved on the file server 165, the DTRs are removed from the DTR mainframe database system 150.

In further embodiments, a computer program can open a filed DTR, automatically log into a mechanized translation system and provision the service. For example, most of the data needed to provision a trunk exists in the filed DTR. The remainder of the information needed to provision the trunk may be specific to a central office. In one embodiment, a Microsoft Access database could store the data associated with each particular central office. A program, such as a Visual Basic program could open the filed DTR and parse out the relevant information. The program could then connect to the Access database and retrieve the office-specific data. Then, a terminal emulator could log into a mainframe database, such as a mechanized translation system database, and provision the trunk.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

The invention claimed is:

1. A method for managing customer service request reports, comprising:

receiving customer data in a mainframe database system based on a plurality of customer requests;

generating a report for each of the plurality of customer requests based on the customer data in the mainframe database system;

assigning a unique report number for each of the generated reports;

providing summaries of at least one of the generated reports to a computer acting as a printer emulator;

importing selected data from the provided report summaries on the printer emulator into a spreadsheet;

saving the spreadsheet on a computer acting as a terminal emulator;

connecting to the mainframe database system with the computer acting as a terminal emulator;

submitting a print request to the mainframe database system from the terminal emulator to print selected reports based on the summary information in the spreadsheet for at least one of the generated reports;

providing the selected reports from the mainframe database system to the printer emulator in response to the print request;

saving the provided reports as word processing documents; and storing the saved reports on a storage device.

2. The method of claim 1, wherein the customer data comprises customer names, locations, and service request dates.

3. The method of claim 1, wherein the selected data comprises report numbers and service request dates.

4. The method of claim 1, wherein a terminal operator selects the at least one report by viewing the spreadsheet.

5. The method of claim 1, wherein a file name for each saved report comprises the report number.

6. The method of claim 1, wherein the storage device comprises a file server.

7. The method of claim 1, wherein a single computer comprises the printer emulator and the terminal emulator.

8. The method of claim 1, further comprising deleting the customer data from the mainframe database system.

9. The method of claim 8, further comprising deleting the generated reports from the mainframe database system.

10. A method for managing customer service request reports, comprising:

receiving customer data in a mainframe database system based on a plurality of customer requests;

generating a report for each of the plurality of customer requests based on the customer data in the mainframe database system;

assigning a unique report number for each of the generated reports;

providing summaries of at least one of the generated reports to a computer acting as a printer emulator;

importing selected data from the provided report summaries on the printer emulator into a spreadsheet;

saving the spreadsheet on a computer acting as a terminal emulator;

connecting to the mainframe database system with the computer acting as a terminal emulator;

submitting a print request to the mainframe database system from the terminal emulator to print selected reports based on the summary information in the spreadsheet for at least one of the generated reports;

providing the selected reports from the mainframe database system to the printer emulator in response to the print request;

saving the provided reports as word processing documents;

storing the saved reports on a storage device;

deleting the customer data from the mainframe database system; and deleting each generated report from the mainframe database system after the generated report is selected and provided to the printer emulator.

11. A system for managing customer usage reports, comprising:

a mainframe database system for receiving customer data based on a plurality of customer usage submissions;

a computer comprising a printer emulator and a terminal emulator, and in communication with the mainframe database system; and a file server in communication with the computer; wherein the mainframe database system generates a report for each of the plurality of customer usage submissions based on the customer data, at least one of the generated reports is selected for printing, a file is generated comprising report numbers associated with the selected reports, the file is printed to the printer emulator, the computer imports to a spreadsheet selected data from a generated report selected for printing on the printer emulating; the terminal emulator connects to the mainframe database system in response to a print request for at least one selected report based on the summary data in the spreadsheet, the selected report or reports are printed from the mainframe database to the printer emulator, and the printed reports are stored on the file server.

12. The system of claim 11, further comprising a local area network in communication with the file server.

13. The system of claim 12, wherein the stored reports are accessible from the local area network.

14. The system of claim 11, wherein the printed reports are stored on the file server as work processing documents.

* * * * *